(12) United States Patent
Hull

(10) Patent No.: US 9,077,163 B2
(45) Date of Patent: Jul. 7, 2015

(54) CABLE TRAILER

(71) Applicants: Kerry Hull, Rochedale (AU); Kevin Hul, Rochedale (AU)

(72) Inventor: Kevin Hull, Rochedale (AU)

(73) Assignees: Kevin Hull, Rochedale, Qld (AU); Kerry Hull, Rochedale, Qld (AU)

( * ) Notice: Subject to any disclaimer, the term of this patent is extended or adjusted under 35 U.S.C. 154(b) by 14 days.

(21) Appl. No.: 14/032,581

(22) Filed: Sep. 20, 2013

(65) Prior Publication Data

US 2014/0086688 A1    Mar. 27, 2014

(30) Foreign Application Priority Data

Sep. 21, 2012   (AU) ................................. 2012904115

(51) Int. Cl.
*H02G 9/02*    (2006.01)
*F16L 1/032*   (2006.01)
*H02G 1/06*    (2006.01)

(52) U.S. Cl.
CPC *H02G 9/02* (2013.01); *F16L 1/032* (2013.01); *H02G 1/06* (2013.01)

(58) Field of Classification Search
CPC .... B65H 75/425; B65H 2701/33; H02G 1/06; F16L 1/032; F16L 1/065
USPC .......................... 405/154.1, 174, 177; 242/403
See application file for complete search history.

(56) References Cited

U.S. PATENT DOCUMENTS

| 335,129 | A | * | 2/1886 | Holmes et al. | ................. 111/100 |
| 359,701 | A | * | 3/1887 | Wilde | ............................ 405/174 |
| 2,783,025 | A | * | 2/1957 | Scheidt | ......................... 254/396 |
| 3,175,716 | A | * | 3/1965 | Masseria | ....................... 414/495 |
| 3,650,492 | A | * | 3/1972 | Stum | .............................. 242/390 |
| 4,047,599 | A | * | 9/1977 | Rousseau | ................. 191/12.2 A |
| 4,071,203 | A | * | 1/1978 | Sneed et al. | ................ 242/390.7 |
| 4,871,127 | A | * | 10/1989 | Clark | ............................. 242/364 |
| 4,945,938 | A | * | 8/1990 | Ponsford et al. | ............ 137/15.01 |
| 5,156,355 | A | * | 10/1992 | Wadle | ............................. 242/470 |
| 6,419,424 | B1 | * | 7/2002 | Null et al. | ...................... 405/174 |

* cited by examiner

*Primary Examiner* — Tara M. Pinnock
(74) *Attorney, Agent, or Firm* — Davis & Bujold, P.L.L.C.; Michael J. Bujold

(57) ABSTRACT

The present invention is directed to cable trailer that can carry a cable drum having a weight up to 10 ton. The cable trailer is designed to carry and unwind cable from the cable drum and direct and lay the cable in or along a trench. The cable trailer has a trailer chassis with an internal aperture enclosed by a tail gate. The tail gate can open or be removed to provide access to the space of the internal aperture for the cable drum. The cable trailer has two mounting arms to mount the cable drum. The cable trailer has a bridge with a cable director to facilitate removing cable from the cable drum and at least one cable support arm extendable from a side of the chassis for directing and laying of the cable.

16 Claims, 8 Drawing Sheets

CABLE TRAILER

FIELD OF INVENTION

The present invention relates to a trailer for supporting a heavy cable drum and laying cable along or in a trench. The present invention has particular but not exclusive application for supporting cable drums weighing up to 10 tonnes. The present invention has particular but not exclusive application for supporting and laying electricity carrying cables and fiber optic cables.

BACKGROUND OF THE INVENTION

Cable trailers capable of carrying a cable drum weighing up to six tonnes have been developed. There are no cable trailers capable of supporting drums carrying cable that are heavier than six tonnes. This is frustrating where cable is to be laid over long distances and where the cable is relatively thicker and heavier with a relatively wide diameter to support electrical power transmission or telecommunications. There are a number of problems preventing the carriage of large and heavy cable drums and the laying of cable from these drums. These problems include engineering issues dealing with heavier cable drums, supporting of cable drums in the manner that the drum spindle is level and permits even rotation of the drum, and supporting cable from the cable drum to the trench to prevent stressing the cable and causing a weakness or fracture.

OBJECT OF THE INVENTION

It is an object of the present invention to provide a cable trailer capable of supporting a cable drum weighing up to ten tonnes that overcomes at least in part one or more of the above mentioned disadvantages.

SUMMARY OF THE INVENTION

In one aspect the present invention broadly resides in a cable trailer to support a cable drum weighing up to 10 tonnes and for laying cable in or along a trench, including
a trailer chassis having an internal aperture enclosed by a tail gate, said tail gate can open or be removed to provide access to the space of the internal aperture;
two mounting arms to mount the cable drum, said mounting arms are spaced apart by the internal aperture and are substantially equidistant from the tailgate;
a bridge having a cable director to facilitate removing cable from the cable drum;
at least one cable support arm extendable from a side of the chassis;
a plurality of cable guides positioned on the at least one cable support arm to facilitate directing cable;
hydraulic means for positioning of the at least one cable support arm and mounting the cable drum on the mounting arms; wherein in use the cable drum is mounted on the mounting arms within the space of the internal aperture and the cable is passaged via the cable director and cable guides to the trench.

Preferably the tailgate can pivotally open and close. Preferably the tailgate can be locked in a closed position. More preferably the tailgate can open to allow a cable drum to enter and occupy the space of the internal aperture.

Preferably there is a drum spindle locatable within the centre aperture of the cable drum. More preferably the drum spindle has a securable collar on either outer side of the cable drum. Preferably there are internal collars securable about the spindle and abutting an internal surface of the cable drum.

Preferably the cable drum can be positioned adjacent the mounting arms by the positioning of the trailer about the cable drum and where the cable drum occupies the space of the internal aperture.

Preferably each mounting arm has securing means to secure the drum spindle. Preferably the mounting arms are hydraulically operated to lift the cable drum off the ground and be substantially level. The securing means preferably includes securing arm brackets that can locate about the drum spindle and lock into position.

Preferably the bridge extends across the internal aperture. Preferably the cable director is a recess or an opening through which the cable is threaded and allows the cable to be directed to the at least one cable support arm. The cable director preferably includes one or more rollers to facilitate the unwinding of the cable. More preferably the director is a recess with two opposing side rollers that are bugle shaped to encourage the cable downwards. Preferably the cable director is substantially at the same height as the cable on the cable drum.

Preferably there are two cable support arms with one on each side of the trailer chassis.

The at least one cable support arm can preferably extend outwardly from the trailer chassis and downward from the trailer chassis with the assistance of one or more hydraulic rams. The cable guides are preferably openings through which cable is threaded and passaged to direct the position of the cable and the laying of the cable in a trench. Preferably each of the cable guides has one or more rollers to assist in the movement of cable through the cable guides. Preferably there are sufficient cable guides to adequately direct the cable and substantially prevent a weakness or fracture of the cable.

Preferably there are one or more drum rollers to move the drum and unwind the cable from the drum. Preferably the one or more drum rollers can apply a brake to slow or stop the rotation of the cable drum. Preferably the one or more drum rollers are positioned substantially beneath the bridge and abut the cable drum when the cable drum is mounted and in position.

The attached vehicle is preferably a prime mover, tractor or dozer.

The hydraulic rams are preferably operated from a diesel hydraulic system onboard the trailer. Preferably there is an engine on the trailer which operates the hydraulic ram system. Preferably the engine also operates the drum rollers.

As an alternative to hydraulic rams, the cable trailer may have pneumatically operated rams and a pneumatic operating system.

Preferably the operation of the trailer in mounting the cable drum and unwinding cable from the drum is controlled by the engine and controls on the trailer. Preferably the operations of controlling the drum speed and unwinding cable and positioning of cable in a trench can be remotely controlled.

Preferably the chassis includes a tow bar hitch suitable for attachment to the dozer, tractor or similar vehicle.

In another preferred embodiment, the invention broadly resides in a method of laying cable using the cable trailer as described above. The method includes the steps of opening the tailgate;
reversing the trailer about the cable drum so that it occupies the space of the internal aperture;
closing and securing the tailgate;
securing the drum spindle to securing arm brackets on the mounting arms;
raising the cable drum until it is suspended off the ground and substantially level;

threading cable through the cable director and the cable guides; and operating the cable trailer to unwind cable from the cable drum and lay cable in the trench.

The abovementioned method may include the preliminary step of positioning the drum spindle within the central aperture of the drum and securing the spindle to the cable drum.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
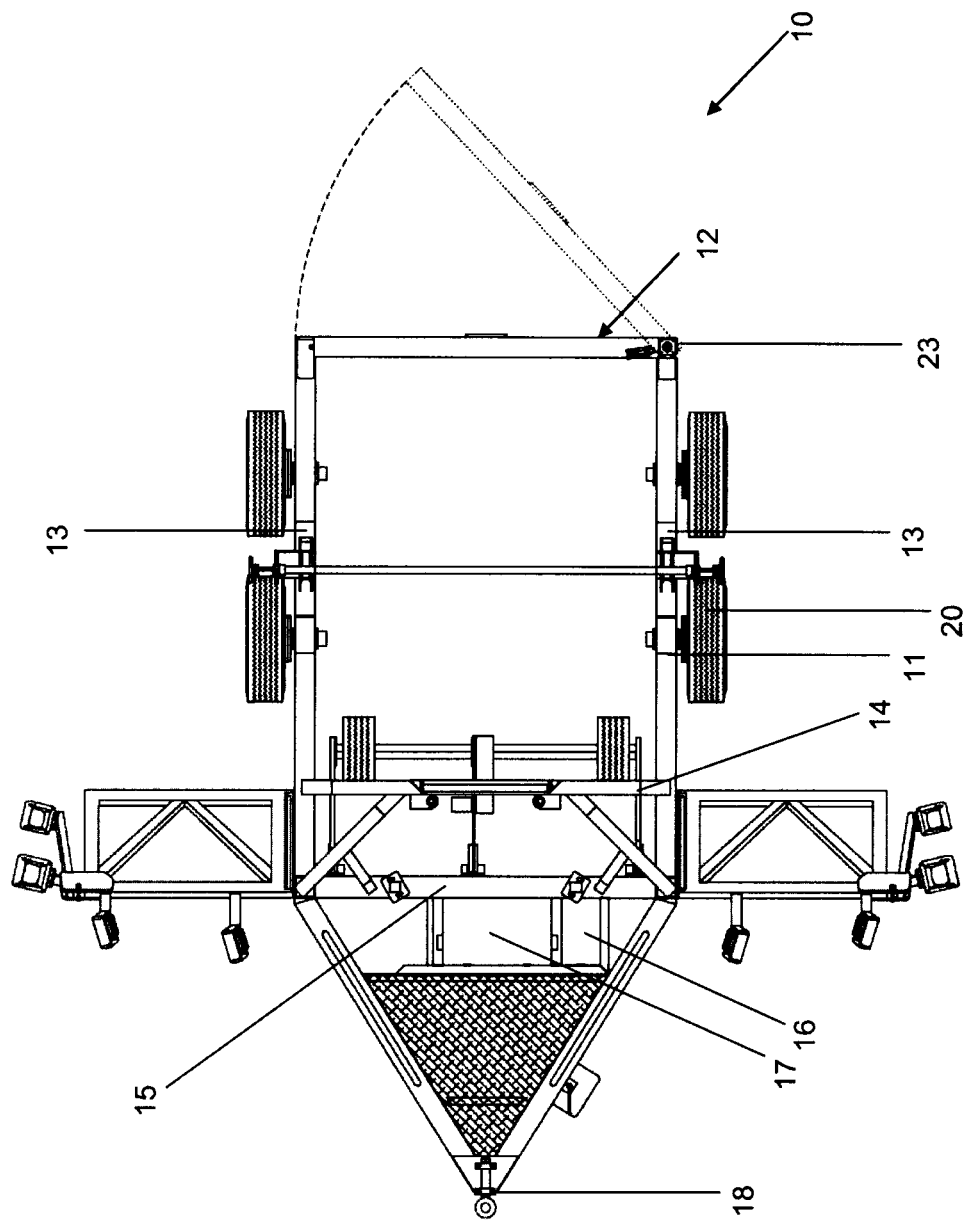
FIG. 1 is a diagrammatic partial plan view of the cable trailer.
Figure 2:
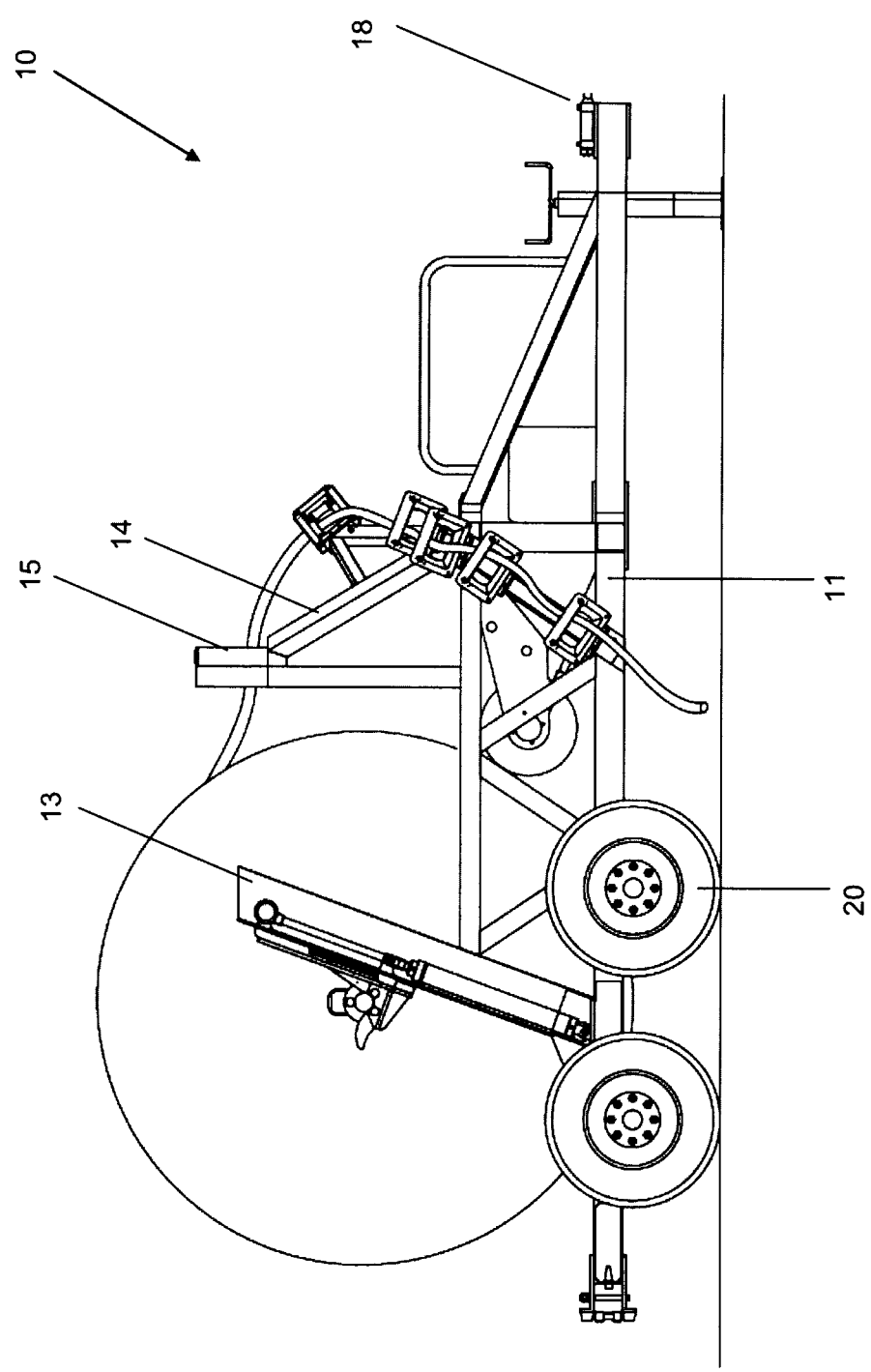
FIG. 2 is a diagrammatic partial side view of the cable trailer.

With reference to the figures, there is shown a cable trailer 10 having a chassis 11, hinged tailgate 12, mounting arms 13, bridge 14, cable director 15, diesel engine 16, compressor 17 and tow bar hitch 18. The cable trailer 10 is supported by two sets of wheels 20.

The cable trailer 10 has an internal aperture 21 within which a cable drum can be positioned.

Figure 4:
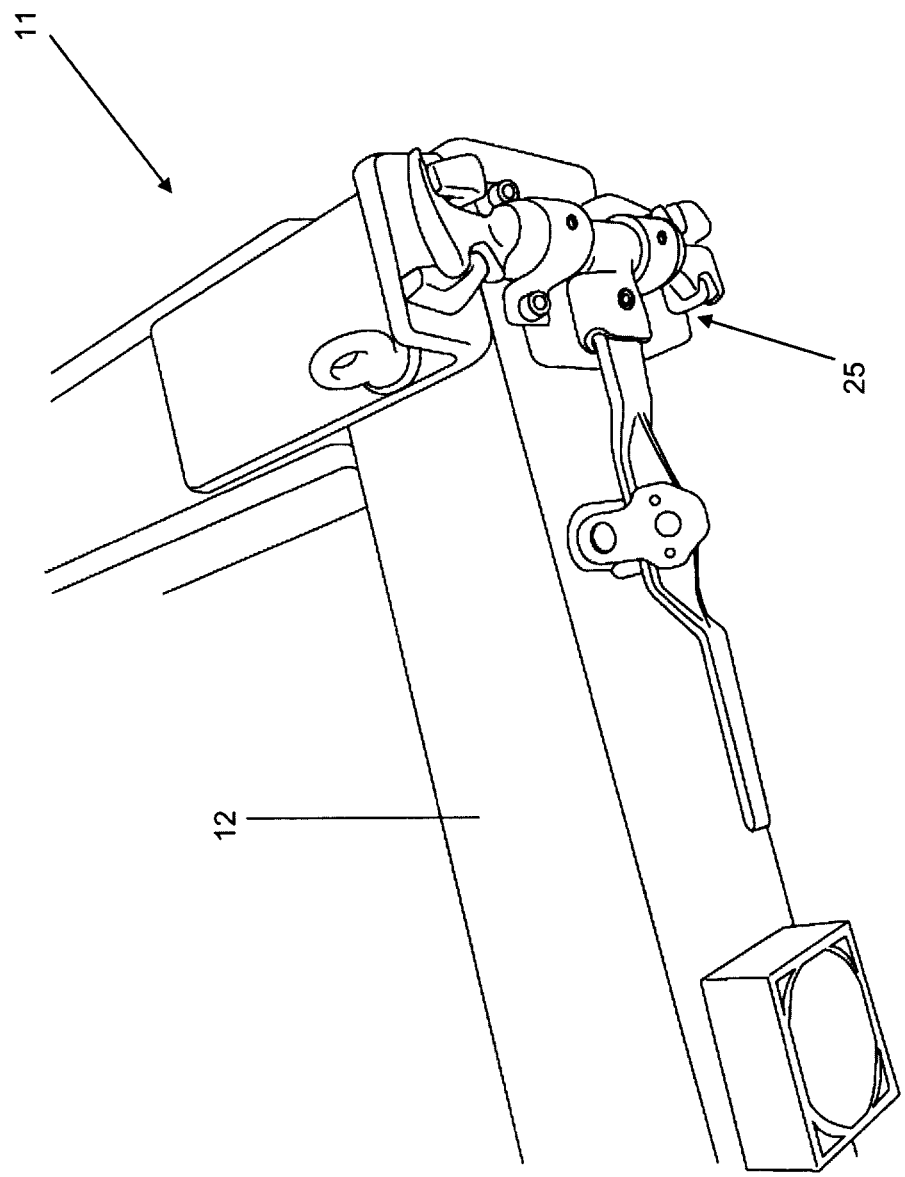
FIG. 4 is a diagrammatic view of the locking mechanism of the tailgate of the cable trailer.
Figure 5:
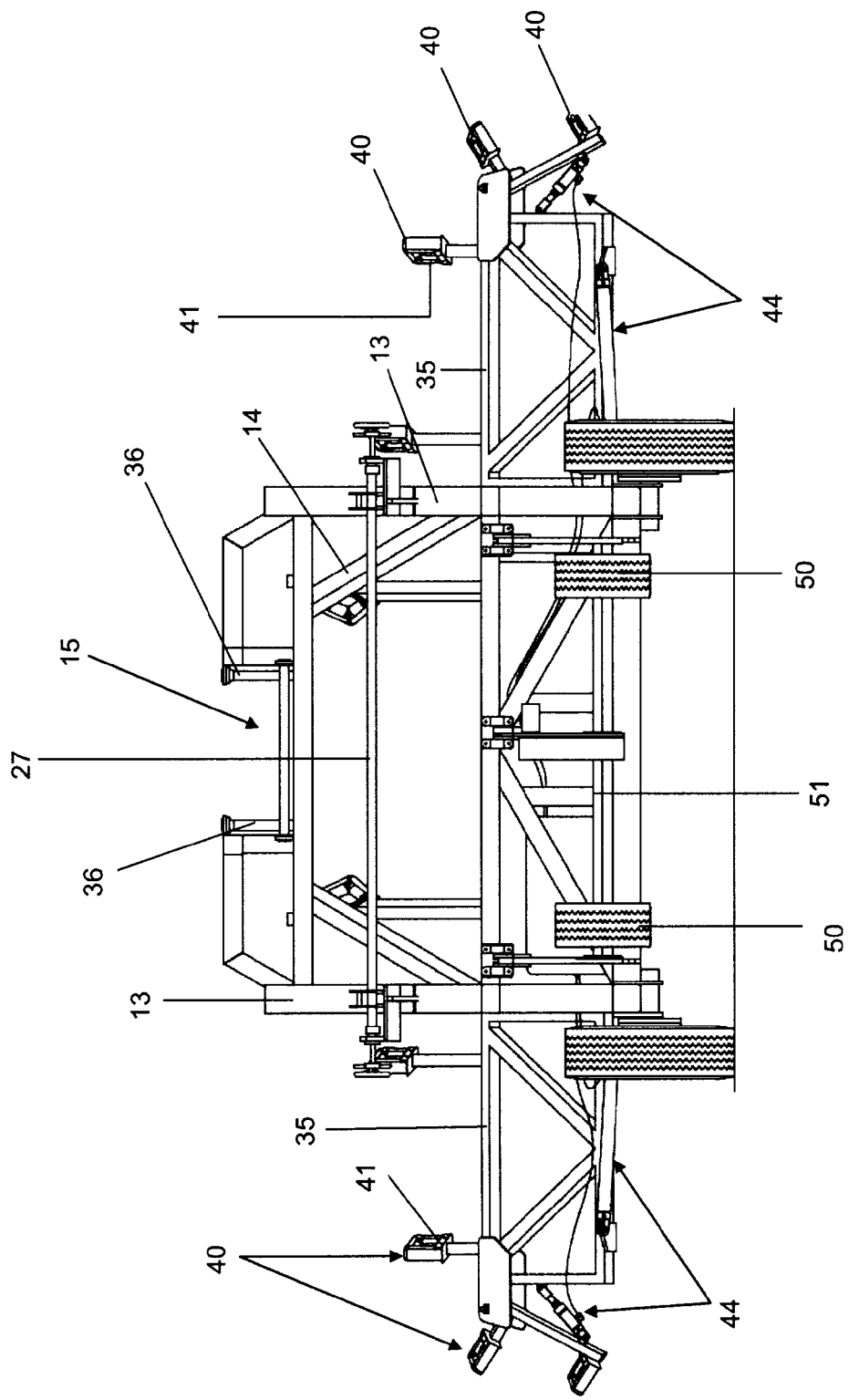
FIG. 5 is a diagrammatic rear view of the cable trailer.
Figure 6:
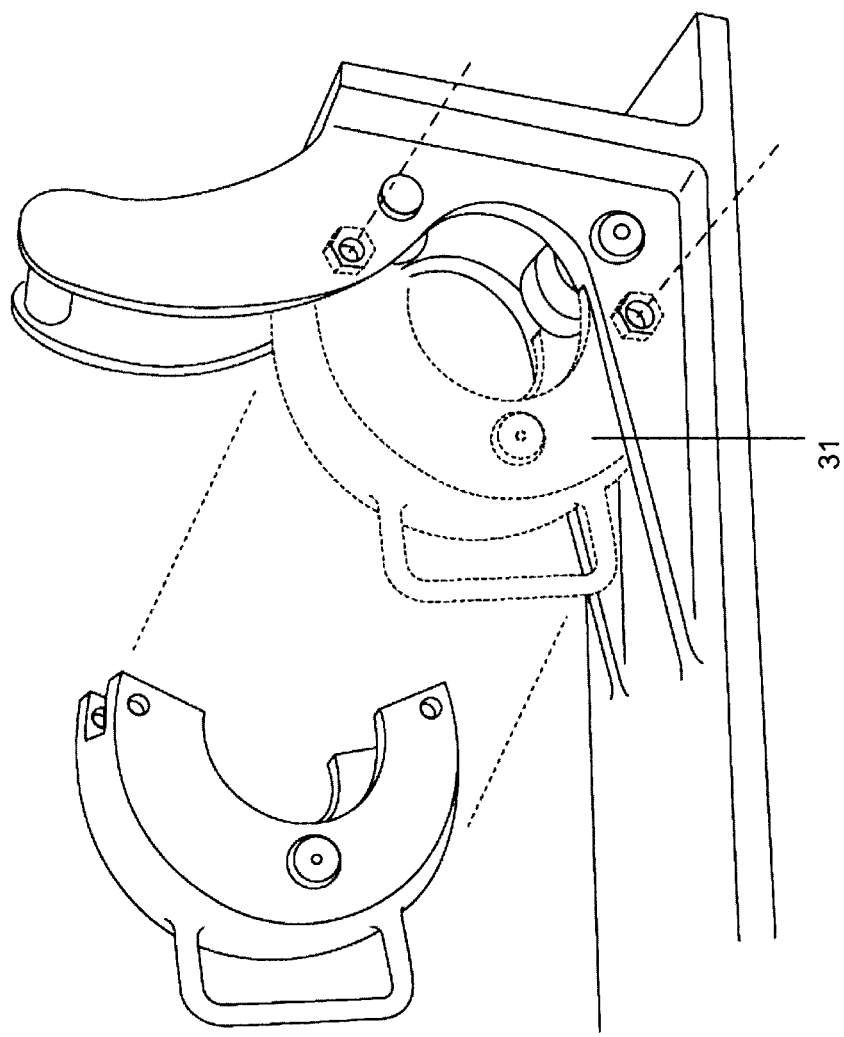
FIG. 6 is a diagrammatic partial view of the securing arm bracket to secure the drum spindle to the mounting arm.
Figure 7:
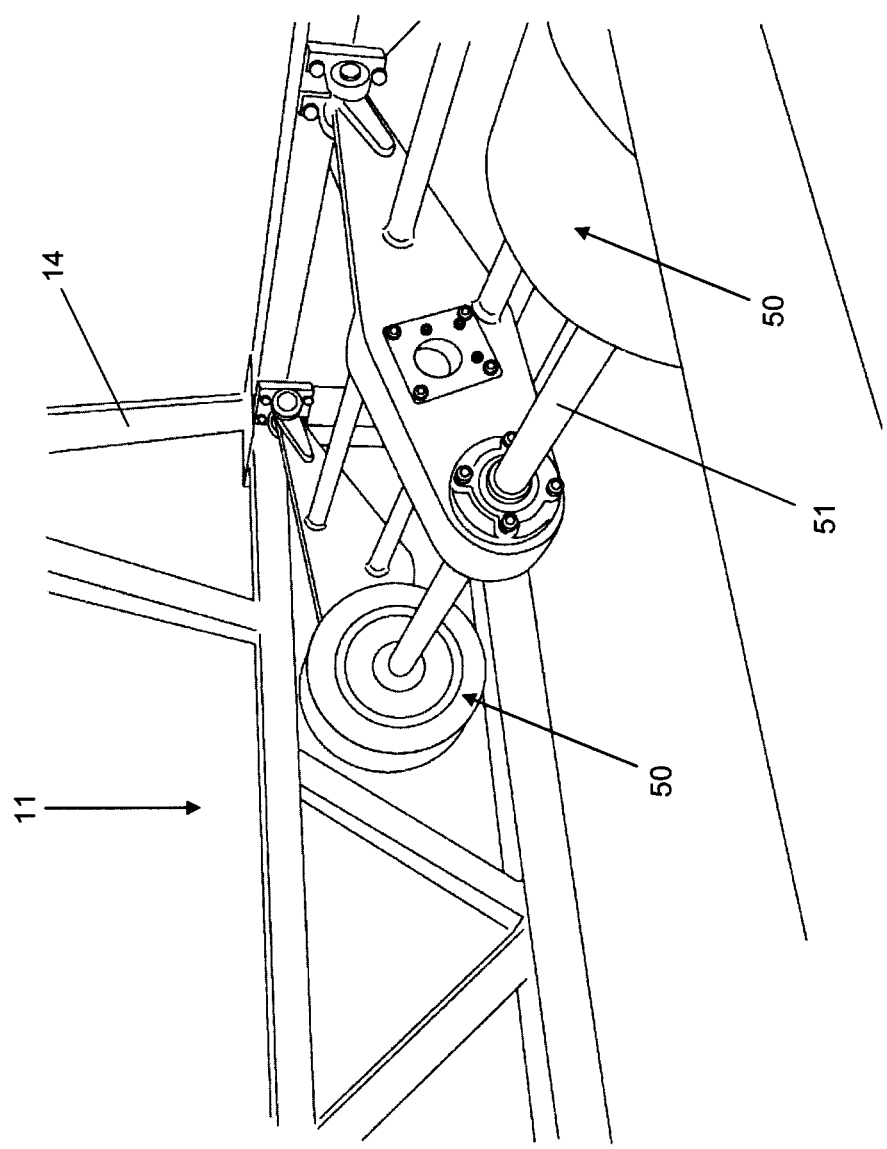
FIG. 7 is a diagrammatic partial view of the drum roller of the cable trailer.
Figure 8:
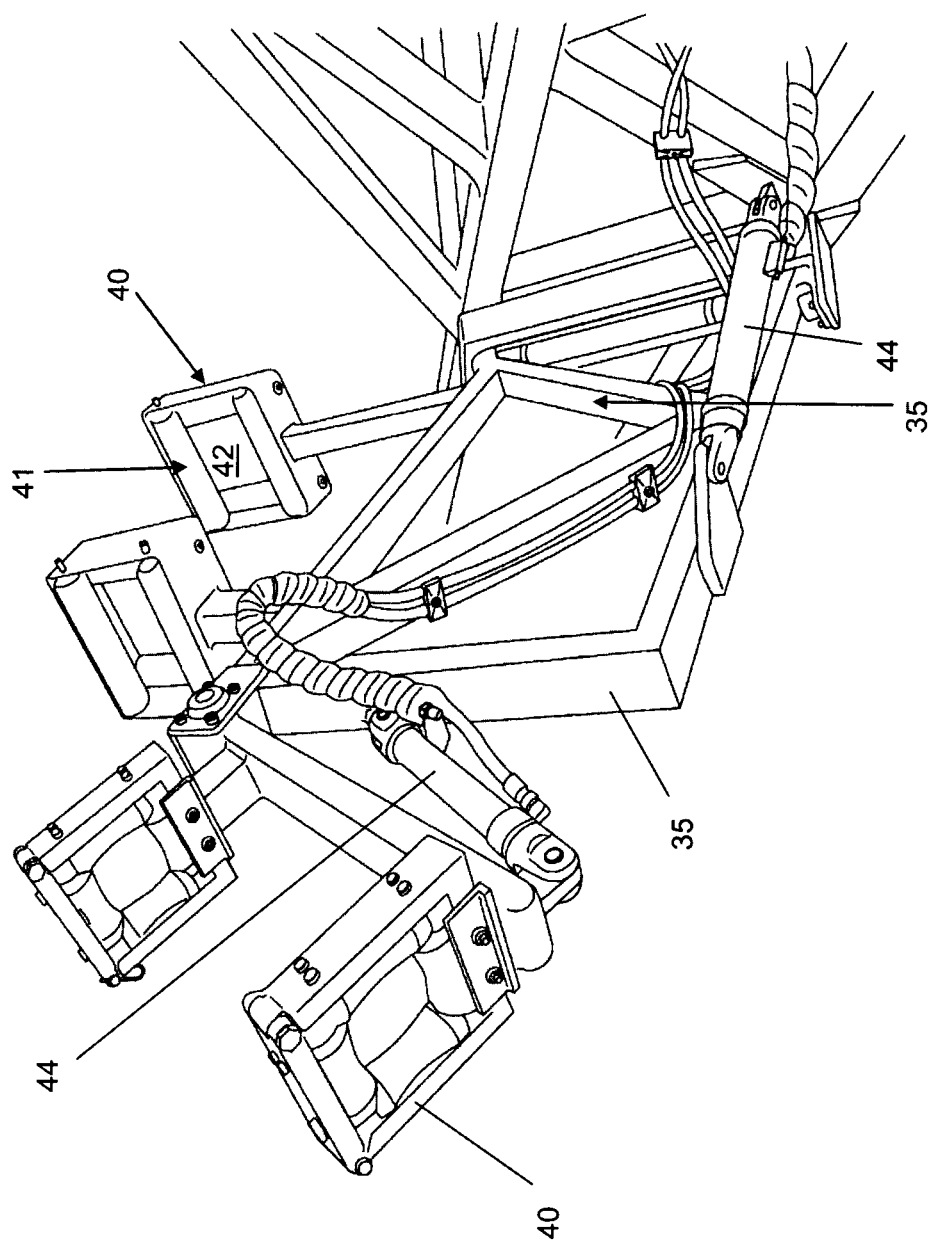
FIG. 8 is a diagrammatic partial view of the cable support arm.

The tailgate 12 has a hinge 23 at one end. The tailgate 12 can open to allow access to the internal aperture 21. In use, the cable trailer 10 is positioned about the cable drum, usually by reversing the cable trailer 10 to locate the cable drum within the space of the internal aperture 21. When the cable drum is located within the space of the internal aperture 21, the tailgate 12 is closed and locked in position by pivot lock 25 (see FIG. 4).

Figure 3:
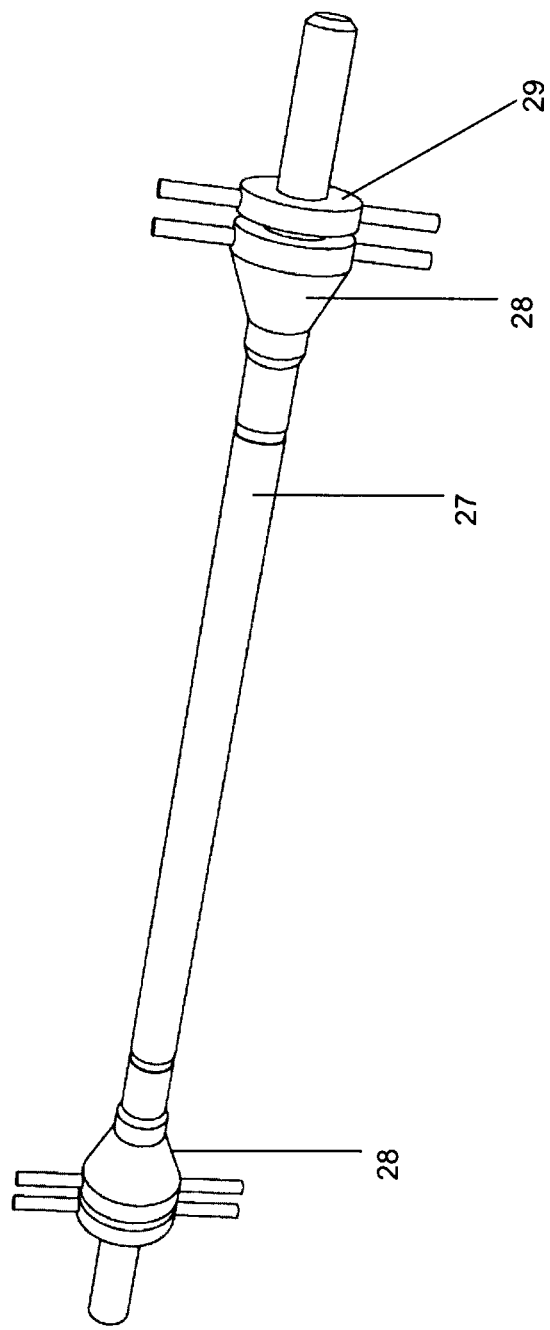
FIG. 3 is a diagrammatic view of the drum spindle with outer and inner collars.

The cable drum has a drum spindle 27 positioned within the central aperture of the drum and secured in position by attachment of internal collars 28 that abut an internal surface of the drum and outer collars 29 (see FIG. 3). The ends of drum spindle 27 are captured by securing arm bracket 31 which locks the drum spindle 27 to the mounting arms 13. The mounting arms 13 are hydraulically operated via the compressor 17 (and engine 16). The mounting arms 13 raise the cable drum off the ground to a position where the drum spindle 27 is level. Cable from the cable drum is threaded through the cable director 15 and to one side of the cable trailer 10 and to the cable support arm 35. The cable director 15 has a roller 36 on each side of the cable director 15 to facilitate movement of the cable from the drum to the cable support arm 35. Cable is threaded through each of the cable guides 40 that are located along the cable support arm 35. Each of the cable guides 40 have rollers 41 surrounding the opening 42. The cable support arm 35 is hydraulically controlled by a series of hydraulic rams 44 to position the end of the cable support arm 35 adjacent a trench where the cable is to be laid. The cable support arm 35 is hinged to the trailer chassis 11. The cable support arm 35 can extend outward and downward.

There are two cable support arms 35 with each located on either side of the chassis 11. Having two cable support arms 35 on either side of the chassis 11 allows the cable trailer 10 to be used to lay cable irrespective of which side of the trench the cable trailer 10 and vehicle must travel to lay the cable.

The rotation of the cable drum is controlled by the drum rollers 50. In use the drum rollers 50 abut the cable drum when it is in its mounted raised position on the mounting arms 13. The drum rollers 50 are spaced apart by axle 51. The rotation of axle 51 is driven by engine 16. The drum rollers 50 control the speed and braking of the cable drum.

The operation of mounting and raising the cable drum, the rotation of the cable drum, the positioning of the cable support arms can be remotely controlled by persons standing apart from the trailer during operation. The ability to provide remote control is a safety advantage as the cable drum can weigh up to 10 tonne and the various components are heavy in order to be able to use these large and heavy cable drums. Preferably there is a manual override to the remote controls. The manual override is located on the control panel (not shown) adjacent the engine 16 and compressor 17.

In use, three people are required to operate the cable trailer. There is a driver in the dozer which pulls the cable trailer 10. There is a second person standing behind the cable trailer 10 and watching the cable being laid in the trench. This second person is also the operator of the remote control for the operations of the cable trailer 10. There is a third person who stands to one side of the second person and laterally spaced from the cable trailer 10 and acts as a spotter to coordinate actions between the second person and the vehicle driver. The spotter can preferably see both the driver and the second person standing behind the cable trailer 10.

An advantage of the preferred embodiment of the cable trailer is that it can carry a cable drum having a weight up to 10 tonne and has the features of being able to self load and unload the cable drum, rotate and control (and brake) the cable drum, laying of cable in a trench from either side of the trailer and having the capacity to remotely control the laying of cable and the operation of the trailer. The trailer has been designed to carry and unwind a heavy cable drum by including features such as dual axle, hydraulic lifting of the drum, hydraulic manipulation of the cable support arms, cable guides to facilitate the unwinding of the cable and directing the placement of the cable.

Variations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A cable trailer to support a cable drum weighing up to 10 ton and for laying cable in or along a trench, including a trailer chassis having an internal aperture enclosed by a tail gate, said tail gate can open or be removed to provide access to the space of the internal aperture;

two mounting arms to mount the cable drum, said mounting arms are spaced apart by the internal aperture and are substantially equidistant from the tailgate; a bridge having a cable director to facilitate removing cable from the cable drum;

at least one cable support arm extendable from a side of the chassis;

a plurality of cable guides positioned on the at least one cable support arm to facilitate directing cable; and hydraulic ram system for positioning of the at least one cable support arm and mounting the cable drum on the mounting arms; wherein in use the cable drum is mounted on the mounting arms within the space of the internal aperture and the cable is passaged via the cable director and cable guides to the trench.

2. The cable trailer as claimed in claim 1 wherein the tail gate can pivotally open to allow a cable drum to enter and occupy the space of the internal aperture and close.

3. The cable trailer as claimed in claim 1, wherein in use the cable drum is positioned adjacent the mounting arms and occupies the space of the internal aperture, each of the mounting arms can be secured using securing arm brackets that can locate about the drum spindle and lock the drum spindle.

4. The cable trailer as claimed in claim 1, wherein the mounting arms are hydraulically operated to lift the cable drum off the ground and be substantially level.

5. The cable trailer as claimed in claim 1, wherein the bridge extends across the internal aperture and the cable director is a recess or an opening through which the cable is threaded and allows the cable to be directed to the at least one cable support arm.

6. The cable trailer as claimed in claim 1, wherein the cable director includes one or more rollers to facilitate the unwinding of the cable.

7. The cable trailer as claimed in claim 1, wherein the cable director is a recess with two opposing side rollers that are bugle shaped to encourage the cable downwards.

8. The cable trailer as claimed in claim 1, wherein there are two cable support arms with one on each side of the trailer chassis.

9. The cable trailer as claimed in claim 1, wherein the at least one cable support arm is pivotally mounted and can extend outwardly from the trailer chassis and downward from the trailer chassis with the assistance of one or more hydraulic rams.

10. The cable trailer as claimed in claim 1, wherein the cable guides are openings through which cable is threaded and passaged to direct the position of the cable and the laying of the cable in a trench.

11. The cable trailer as claimed in claim 1, wherein each of the cable guides has one or more rollers to assist in the movement of cable through the cable guides.

12. The cable trailer as claimed in claim 1, wherein there are one or more drum rollers to move the cable drum and unwind the cable from the drum.

13. The cable trailer as claimed in claim 1, wherein the one or more drum rollers are positioned substantially beneath the bridge and abut the cable drum when the cable drum is mounted and in position.

14. The cable trailer as claimed in claim 1, wherein the hydraulic rams are operated from a diesel hydraulic system onboard the trailer.

15. The cable trailer as claimed in claim 1, wherein the operation of the trailer in mounting the cable drum and unwinding cable from the drum is controlled by an engine.

16. The cable trailer as claimed in claim 1, wherein the operations of controlling the drum speed and unwinding cable and positioning of cable in a trench can be remotely controlled.

* * * * *